United States Patent
Aaron

[19]

[11] Patent Number: 5,807,021
[45] Date of Patent: Sep. 15, 1998

[54] GROUND COVER MAT MANUFACTURED FROM RECYCLED PLASTIC

[76] Inventor: James F. Aaron, R.D. #5, Box 567, Keely Rd., Franklin, Pa. 16323

[21] Appl. No.: 564,590

[22] Filed: Nov. 29, 1995

[51] Int. Cl.⁶ .................................................. B60B 39/12
[52] U.S. Cl. ............................... 404/19; 404/35; 52/177; 238/14; D25/163
[58] Field of Search .................................. 404/19, 35, 36, 404/44; 428/156, 213; D25/163, 157, 158, 159; 238/14; 52/177

[56] References Cited

U.S. PATENT DOCUMENTS

| | | | |
|---|---|---|---|
| D. 95,158 | 4/1935 | Surerus | D25/158 |
| D. 140,623 | 3/1945 | Harper | 404/19 |
| D. 342,330 | 12/1993 | Kobayashi | D25/158 |
| 937,415 | 10/1909 | Cairns | 404/19 |
| 2,975,977 | 3/1961 | Chodacki et al. | 238/14 |
| 3,268,384 | 8/1966 | Frick et al. | D25/163 |
| 3,701,474 | 10/1972 | Welz | 238/14 |
| 3,836,075 | 9/1974 | Botbol | 238/14 |
| 3,997,110 | 12/1976 | Aumont | 238/14 |
| 4,111,585 | 9/1978 | Mascaro | 404/70 |
| 4,133,481 | 1/1979 | Bennett | 238/14 |
| 4,478,901 | 10/1984 | Dickens et al. | 428/120 |
| 4,572,700 | 2/1986 | Mantarro et al. | 404/35 |
| 4,596,731 | 6/1986 | Cudmore et al. | 428/134 |
| 4,629,358 | 12/1986 | Springston et al. | 404/35 |
| 4,787,556 | 11/1988 | Heisson | 238/14 |
| 4,998,670 | 3/1991 | Peterson | 404/35 X |
| 5,250,340 | 10/1993 | Buhnhoff | 428/99 |
| 5,439,171 | 8/1995 | Fruend | 238/14 |
| 5,499,888 | 3/1996 | Hawkes | 404/19 |
| 5,538,183 | 7/1996 | McGee | 238/14 |

FOREIGN PATENT DOCUMENTS

2-128902  5/1990  Japan ....................... 238/14

*Primary Examiner*—James Lisehora
*Attorney, Agent, or Firm*—Webb Ziesenheim Bruening Logsdon Orkin & Hanson, P.C.

[57] ABSTRACT

The present invention provides a ground cover mat that protects the terrain from a vehicle or the like. The ground cover mat is manufactured by molding recycled polyethylene plastic into a sheet-like mat, which is inexpensive, relatively light in weight, durable in harsh conditions and easy to cut. The ground cover mat includes a pattern of lugs on its upper and lower surfaces to provide a traction surface for the vehicle and to provide friction between the terrain and the ground cover mat.

5 Claims, 4 Drawing Sheets

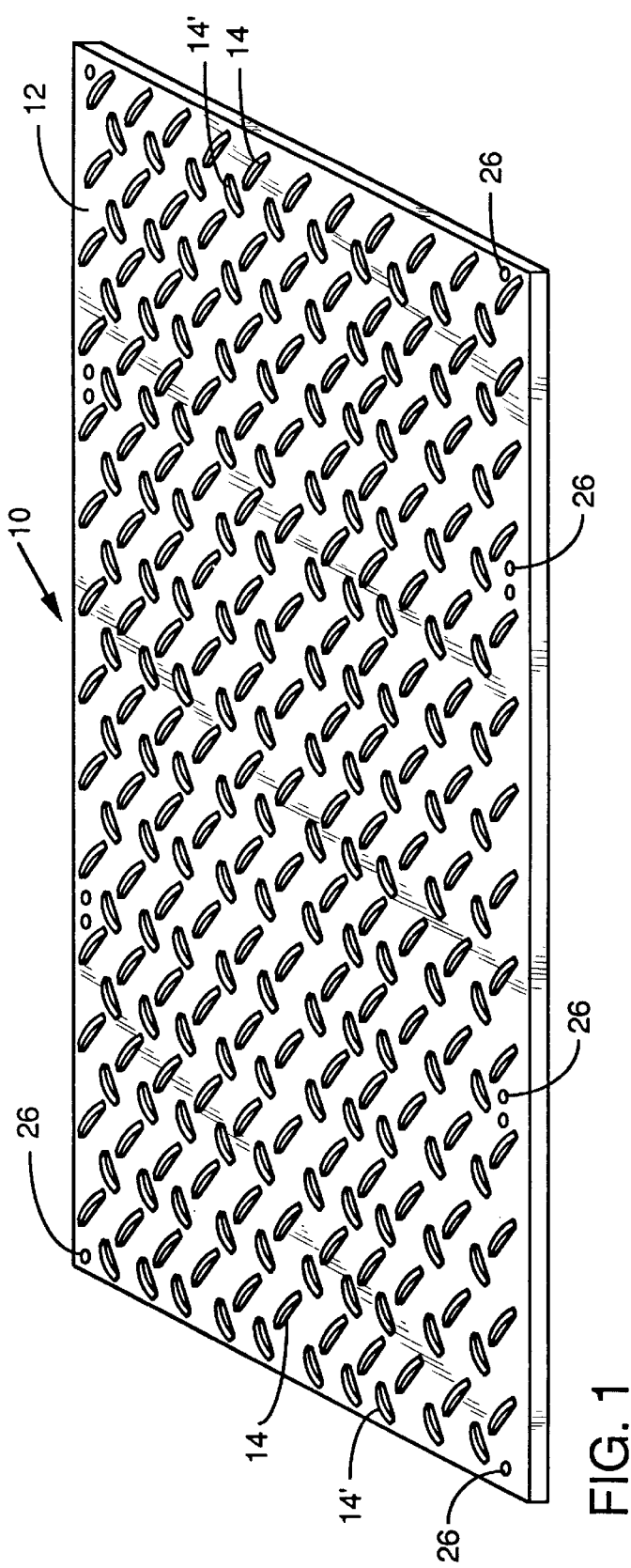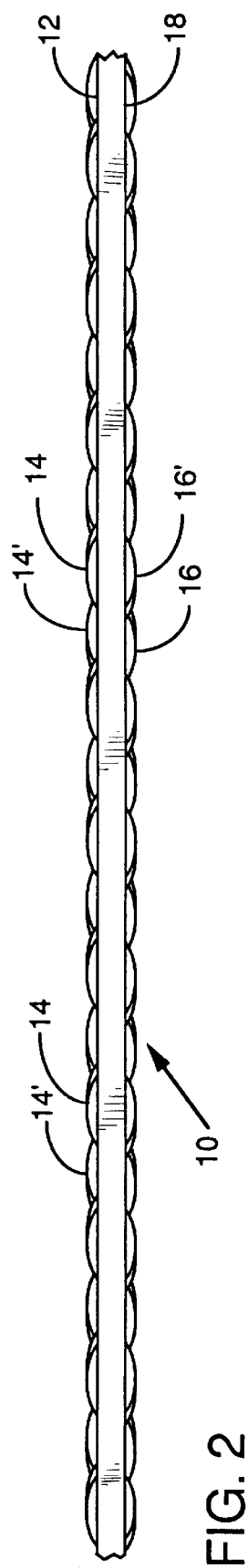

GROUND COVER MAT MANUFACTURED FROM RECYCLED PLASTIC

BACKGROUND OF THE INVENTION

1. Field of the Invention

This invention relates to a ground cover mat to protect the terrain from damage by a vehicle crossing over the terrain while providing traction for the vehicle.

2. Background Art

Heavy equipment users often need to use ground cover mats when moving their equipment across lawns, mud and other soft terrain in order to avoid damage to the terrain by the equipment and/or to prevent the equipment from becoming immobilized by the terrain. Ground cover mats are currently provided in sheet-like form and are made from plywood, aluminum, steel and fiberglass reinforced materials. All of these materials are produced from natural resources that are being depleted.

Plywood sheets are the least durable of the above-mentioned materials when subjected to harsh conditions, such as rain, ice, snow, cold, heat and the heavy weight of equipment. After a few uses in harsh conditions, the plywood sheet tends to curl up and break apart. Therefore, the plywood sheets must be replaced often. Also, the flat surface of the plywood provides little traction for the vehicles. Aluminum and steel are heavier materials and steel is subject to corrosion in harsh environments. Ground cover mats made from fiberglass reinforced materials are more expensive, have little flexibility and are harder to cut into sheets that have smooth edges.

It is an object of the present invention to provide a ground cover mat which is durable, flexible, lightweight, easier to use and less expensive when compared to prior designs. It is also an object of the present invention to reduce the natural resources consumed to produce a ground cover mat.

SUMMARY OF THE INVENTION

The present invention is a ground cover mat to provide traction to vehicles and to protect terrain from damage. The ground cover mat is a molded plastic sheet that includes individual lugs on the upper surface and on the lower surface of the mat. The individual lugs are in an arrangement having a predetermined pattern on the upper and lower surfaces of the mat.

The ground cover mat can be manufactured by placing a quantity of recycled low-density polyethylene alone or mixed with medium density polyethylene into a two-piece mold. The mold containing the quantity of polyethylene is inserted into an oven-press and heated at a predetermined temperature under a predetermined pressure for a time sufficient to allow the polyethylene to conform to the mold and fuse into a solid form of the ground cover mat. The mold is then removed from the oven-press and allowed to cool. The finished ground cover mat is removed from the mold after proper cooling.

BRIEF DESCRIPTION OF THE DRAWINGS

FIG. 1 is a perspective view of an embodiment of a ground cover mat in accordance with the present invention;

FIG. 2 is a side view of the ground cover mat shown in FIG. 1;

DESCRIPTION OF THE PREFERRED EMBODIMENTS

Figure 3:
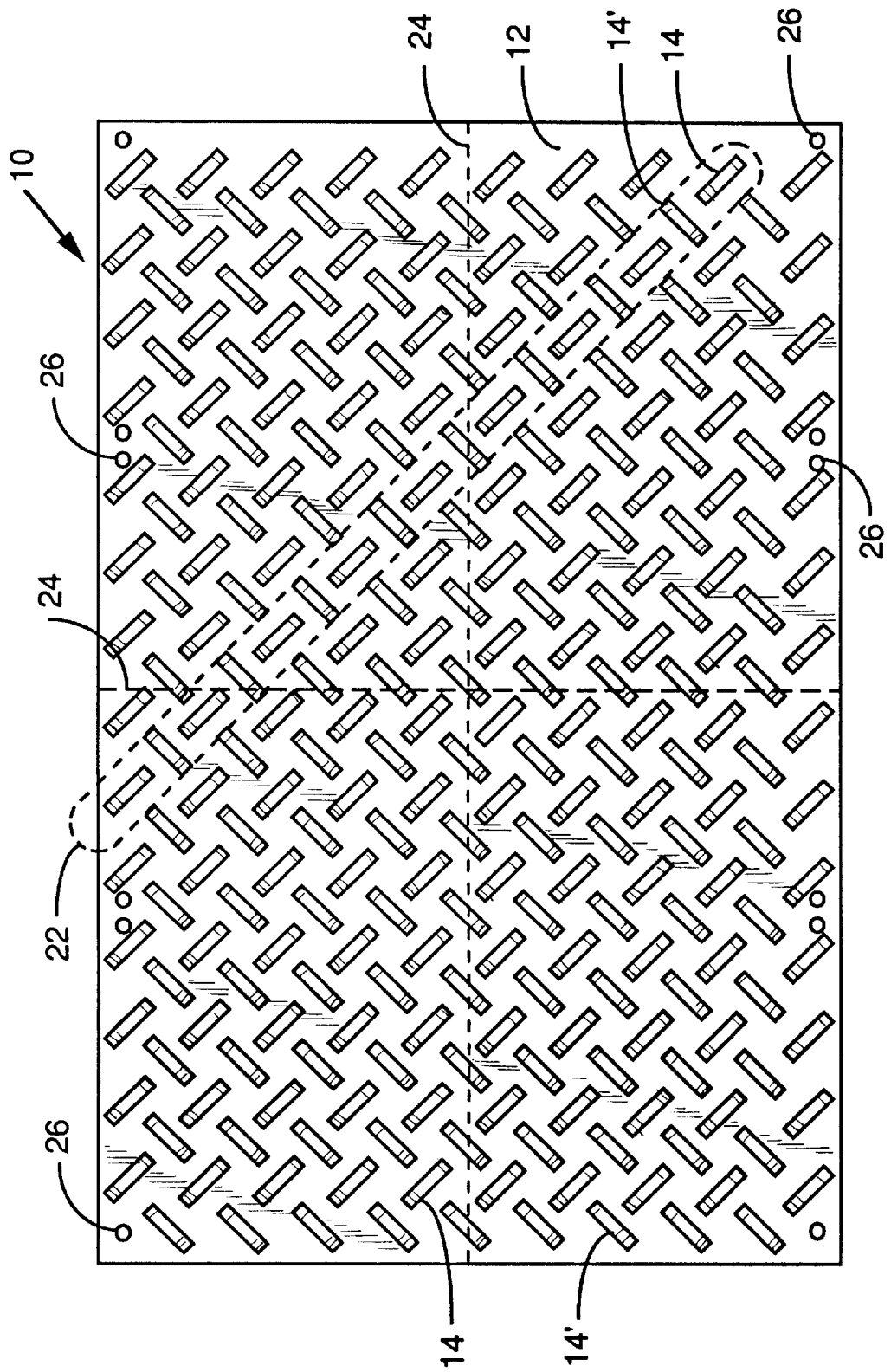
FIG. 3 is a plan view of the ground cover mat shown in FIG. 1.

One embodiment of a ground cover mat in accordance with the present invention is shown in FIGS. 1–5. The ground cover mat 10 is a molded, rectangular sheet-like element having a thickness substantially less than its width or length. An upper surface 12 of the ground cover mat 10 includes a plurality of spaced apart and upstanding lugs 14 and 14' which are formed integrally with the ground mat 10 in a predetermined pattern. A similar pattern of lugs 16, 16' are provided on a lower surface 18 of the ground cover mat 10. The lugs 14, 14' on the upper surface 12 of the ground cover mat 10 provide traction for the tires of a vehicle contacting the ground cover mat 10. The lugs 16, 16' on the lower surface 18 of the ground cover mat 10 provide friction between the ground cover mat 10 and the terrain, which keeps the ground cover mat 10 from slipping or moving along the terrain when a vehicle passes over the ground cover mat 10.

Figure 4:
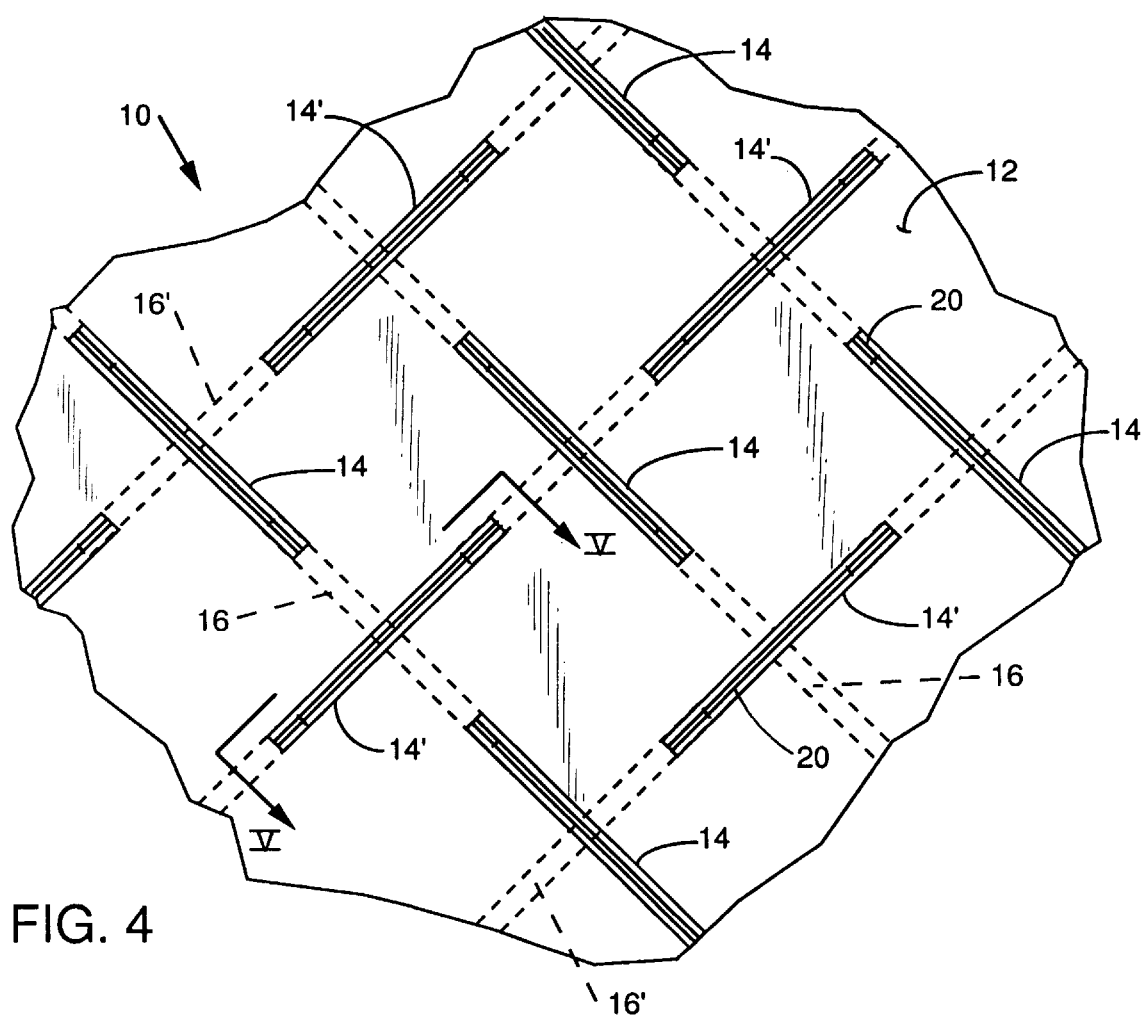
FIG. 4 is an enlarged plan view of a portion of the ground cover mat shown in FIG. 1.
Figure 5:
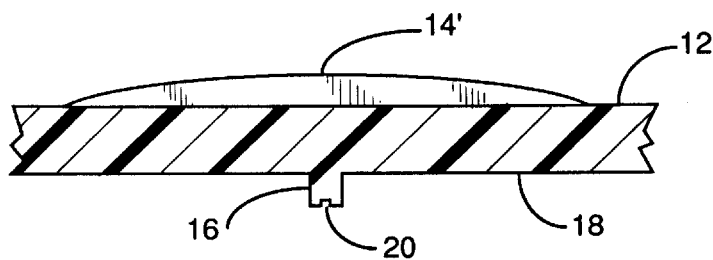
FIG. 5 is a sectional view taken along lines V—V in FIG. 4.

Lugs 14, 14', 16 and 16', which rise above the respective surfaces 12 and 18 of the molded sheet, are arcuate in shape and include a channel 20 along the top center of the lugs as shown in FIGS. 4 and 5. Lugs 14, 14', 16 and 16' have a length which is longer than their height from the surface of their associated surfaces 12 and 18 to the top of the arc and are also longer than their thickness.

Many patterns or arrangements of patterns of the lugs 14, 14', 16 and 16' can be provided. The arrangement shown in FIGS. 1–5 is one example where the lugs 14 are formed on the upper surface 12 of the molded sheet in a first line at an acute angle of forty-five degrees (45°) from any edge of the sheet and lugs 14' are formed in a space between lugs 14 in a second line that intersects the first line at an obtuse angle of one hundred thirty-five degrees (135°) from the same edge whereby lug 14 is perpendicular to lug 14' as described below. The arrangement of lugs 14, 14' on the upper surface 12 is repeated on the lower surface 18 of the molded sheet for lugs 16, 16', but preferably offset by ninety degrees (90°) as described below. This arrangement can be referred to as a diamond plate design. The pattern, outlined for convenience by dotted line 22 in FIG. 3, is formed on the upper surface 12 and is a line of lengthwise oriented and spaced lugs 14 and a lengthwise orientation of similar lugs 14' which intersect the line of lugs 14 at a right angle in space between adjacent lugs 14. This pattern of lugs 14, 14' on the upper surface 12 of the ground cover mat 10 is aligned with similar parallel patterns of lugs 14, 14' on either side of dotted line 22, which are parallel thereto but are offset by one lug so that lugs 14 of the pattern are aligned with and perpendicular to lugs 14' of the parallel patterns. This, in turn, forms an arrangement of lugs on the molded sheet where the lengthwise orientation of each individual lug 14 or 14' has four other lugs having a lengthwise orientation that is at a right angle to the lengthwise orientation of each individual lug. FIGS. 4–5 show that the arrangement and pattern of lugs 16, 16' on the lower surface 18 of the ground cover mat 10 is identical to the pattern of lugs 14, 14' on the upper surface 12, but the pattern of lugs 16, 16' is offset by ninety degrees (90°) in relation to the pattern of lugs 14, 14'.

Ground cover mat 10 shown in FIG. 1 is preferably manufactured in a one-half inch thick, four by eight foot molded sheet, which fits into a standard sized pick-up truck. The ground cover mat 10 can easily be cut by a circular saw, or the like, into smaller sections as shown by dotted lines 24 in FIG. 3. Lugs 14, 14', 16 and 16' preferably have a length of 4¼ inches, a height from the surface of the molded sheet to the top of the arc of ⅜ inches and a thickness of 5/16 inches. It is also preferred to have holes 26 spaced around the perimeter of the ground cover mat 10, including at the four corners, to receive hooks to aid the user in positioning the ground cover mat 10 or to have holes 26 spaced as pairs along the perimeter to receive rope handles for lifting the ground cover mat 10.

Figure 6:
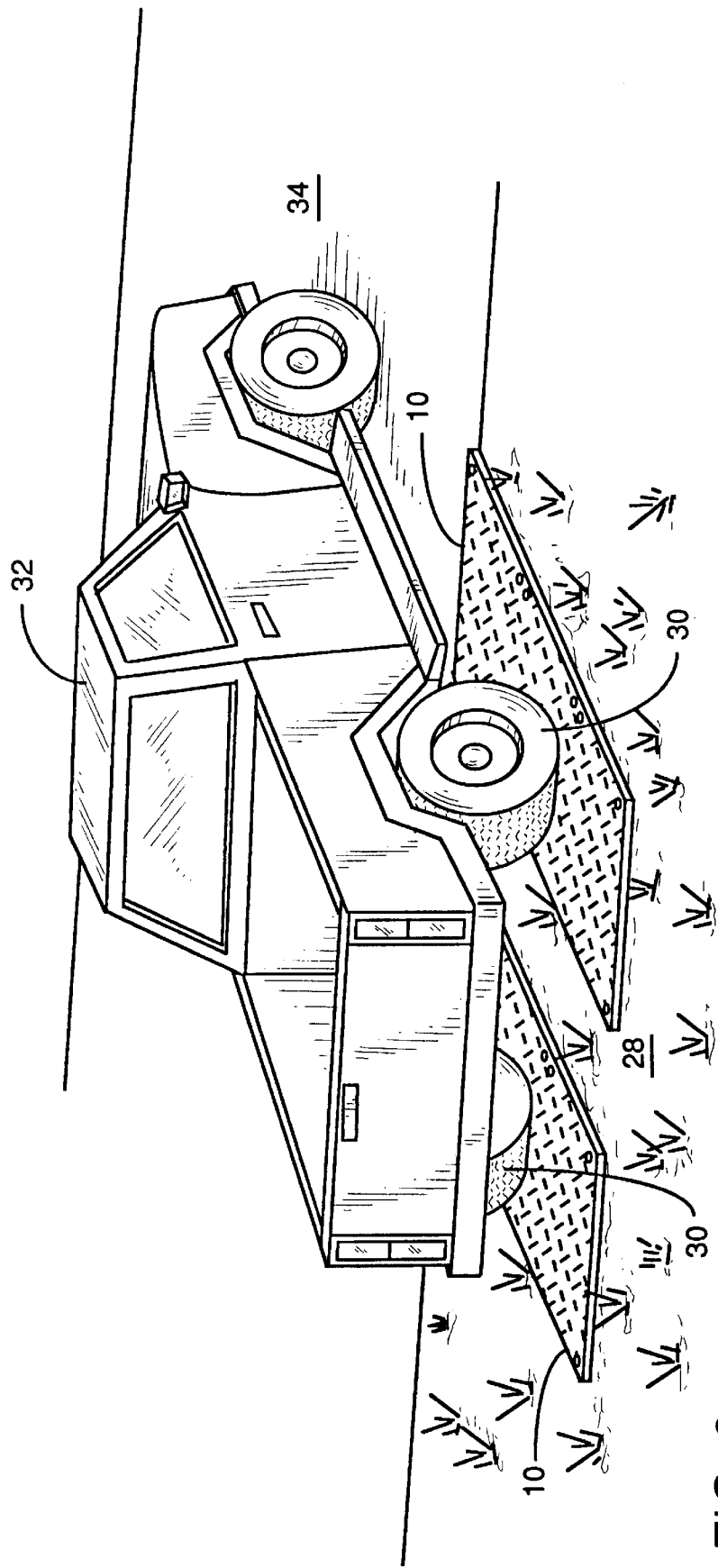
FIG. 6 is a perspective view of the ground cover mat shown in FIG. 1 in use with a vehicle.

FIG. 6 shows the ground cover mat 10 in use. Shown are two ground cover mats 10 placed on a grassy terrain 28 to protect it from damage by rear tires 30 of a vehicle 32. The vehicle 32 is shown with tires 30 passing onto the ground cover mats 10 from roadway 34.

The preferred embodiment of the present invention is a ground cover mat molded from recycled polyethylene plastic which is a lighter and more corrosion resistant material than steel or aluminum. Using recycled polyethylene plastic provides a ground cover mat that is a low cost alternative to fiberglass reinforced mats and is more cost-effective than using plywood sheets. The recycled polyethylene plastic in the present invention allows for a ground cover mat that has high physical strength properties which are resistant to thermal shock, weather, chemicals, cracking, chipping and breaking, yet allows the ground cover mat to be flexible enough to conform to variations in terrain contour.

In manufacturing the ground cover mat 10, polyethylene is placed in a two-piece mold designed to form the molded sheet with the arrangement of lugs 14, 14' on the upper surface 12 and lugs 16, 16' on the lower surface 18 as described above in connection with FIGS. 1–5. The mold is inserted in an oven-press for a predetermined time at a predetermined temperature and under a predetermined pressure until the polyethylene fuses together and forms a molded sheet. The mold is then removed from the oven and allowed to cool. After sufficient cooling the ground cover mat 10 is removed from the mold and holes 26 are drilled therein.

Since recycled polyethylene is used, often with unknown characteristics, some experimentation may be necessary to determine if the polyethylene will work as a ground cover mat and to determine the necessary temperature and pressure and time for the processing. Applicant has found that high density polyethylene will form a ground cover mat that is too brittle for vehicle traffic. Low density polyethylene, or a mixture of low and medium density polyethylene, is preferred. Temperature ranges of three hundred to four hundred degrees Fahrenheit, pressure ranges of thirty-five to fifty pounds per square inch and time ranges of twenty to forty minutes are generally sufficient for the available recycled polyethylene.

The Applicant has manufactured ground cover mats from recycled, low density polyethylene which was ground up into a chipped form. Approximately ninety pounds of the recycled polyethylene chips were placed in a two-piece aluminum mold. The mold was designed to form a one-half inch thick, four feet wide, and eight feet long molded sheet with the arrangement of lugs 14, 14' and lugs 16, 16' on the upper and lower surfaces 12, 18 having the pattern as described earlier in this specification. The mold was inserted in an oven-press for about thirty minutes at about three-hundred and thirty degrees Fahrenheit at a pressure of about forty-five pounds per square inch. The recycled polyethylene fused into a solid mass in the shape of the mold. The mold was then removed from the oven and allowed to cool. After sufficient cooling, the ground cover mat 10 was removed from the mold and holes 26 shown in FIGS. 1, 3 and 6 were drilled. A similar ground cover mat was formed from a mixture of low and medium density polyethylene, at a temperature of about three hundred ten degrees Fahrenheit, under a pressure of about forty pounds per square inch and for a time of about thirty minutes.

While embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A ground cover mat to provide traction to vehicles and to protect terrain from damage, the ground cover mat comprising:

a flexible sheet formed from molded plastic and having an upper surface and a lower surface on opposite sides thereof;

a first plurality of elongated lugs and a second plurality of elongated lugs formed substantially over the entire upper surface of the flexible sheet; and a third plurality of elongated lugs and a forth plurality of elongated lugs formed substantially over the entire lower surface of the flexible sheet, wherein:

each lug has a similar size and has a height that varies between opposite ends thereof in a convex arcuate shape relative to its respective surface of the flexible sheet;

each of the plurality of lugs is disposed in a pattern of parallel columns;

the lugs in each column have their elongated axes aligned;

adjacent lugs in each column are separated by a space;

the columns of the first plurality of lugs and the columns of the third plurality of lugs are positioned in opposition on opposite sides of the flexible sheet;

the lugs of the third plurality of lugs are positioned in opposition with the spaces between adjacent lugs in each column of the first plurality of lugs and vice versa;

the columns of the second plurality of lugs and the columns of the fourth plurality of lugs are positioned in opposition on opposite sides of the flexible sheet and are positioned perpendicular to the columns of the first plurality of lugs and the columns of the second plurality of lugs;

the lugs of the fourth plurality of lugs are positioned in opposition with the spaces between adjacent lugs in each column of the second plurality of lugs and vice versa;

the lugs of the first plurality of lugs have central parts positioned in opposition with central parts of the lugs of the fourth plurality of lugs; and the lugs of the second plurality of lugs have central parts positioned in opposition with central parts of the lugs of the third plurality of lugs.

2. The ground cover mat as claimed in claim 1, further including a plurality of holes drilled along a perimeter of the molded plastic sheet.

3. The ground cover mat as claimed in claim 1, further including a plurality of paired holes drilled along the perimeter of the molded plastic sheet.

4. A ground cover mat to provide traction to vehicles and to protect terrain from damage, the ground cover mat comprising:
- a flexible sheet molded from recycled low-density polyethylene;
- a plurality of elongated lugs formed substantially over an entire upper surface of the flexible sheet and defining a first plurality of parallel columns and a second plurality of parallel columns positioned perpendicular to the first plurality of parallel columns; and
- a plurality of elongated lugs formed substantially over an entire lower surface of the flexible sheet and defining a third plurality of parallel columns and a fourth plurality of parallel columns positioned perpendicular to the third plurality of parallel columns, wherein:
  - each lug has a similar size and has a height that varies between opposite ends thereof in a convex arcuate shape relative to its respective surface of the flexible sheet;
  - each column includes a plurality of lugs having their elongated axes aligned;
  - adjacent lugs in each column are separated by a space;
  - the columns of the first plurality of parallel columns and the columns of the third plurality of parallel columns are positioned in opposition on opposite sides of the flexible sheet;
  - the columns of the second plurality of parallel columns and the columns of the fourth plurality of parallel columns are positioned in opposition on opposite sides of the flexible sheet and are positioned perpendicular to the columns of the first plurality of parallel columns and the columns of the third plurality of parallel columns;
  - the lugs of the first plurality of columns are positioned in opposition with the spaces between adjacent lugs in each column of the third plurality of columns and vice versa;
  - the lugs of the second plurality of columns are positioned in opposition with the spaces between adjacent lugs in each column of the fourth plurality of columns and vice versa;
  - the lugs of the first plurality of columns have central parts positioned in opposition with central parts of the lugs of the fourth plurality of columns; and
  - the lugs of the second plurality of columns have central parts positioned in opposition with central parts of the lugs of the third plurality of columns.

5. A ground cover mat comprising:
- a flexible plastic sheet having an upper surface and a lower surface; and
- a plurality of elongated lugs formed substantially over the entire upper and lower surfaces of the sheet, each lug having a similar size and having a height that varies between opposite ends thereof in a convex arcuate shape relative to its respective surface of the sheet, wherein:
  - the lugs on the upper surface define a first plurality of parallel columns and a second plurality of parallel columns perpendicular to each other;
  - the lugs on the lower surface define a third plurality of parallel columns and a fourth plurality of parallel columns perpendicular to each other;
  - the lugs of each column have their elongated axes aligned and adjacent lugs of each column are separated by a space;
  - the lugs of the first and third plurality of parallel columns and the lugs of the second and fourth plurality of parallel columns are positioned in opposition on opposite sides of the sheet;
  - the lugs of the third plurality of parallel columns are positioned in opposition with the spaces between adjacent lugs in each column of the first plurality of columns and vice versa;
  - the lugs of the fourth plurality of parallel columns are positioned in opposition with the spaces between adjacent lugs in each column of the second plurality of columns and vice versa; and
  - the lugs of the first and fourth plurality of columns and the lugs of the second and third plurality of columns have central parts positioned in opposition on opposite side of the sheet.

\* \* \* \* \*